US012046409B2

(12) United States Patent
Zhang et al.

(10) Patent No.: US 12,046,409 B2
(45) Date of Patent: Jul. 23, 2024

(54) TRANSFORMER AND SWITCH-MODE POWER SUPPLY

(71) Applicant: Huawei Technologies Co., Ltd., Shenzhen (CN)

(72) Inventors: Hongbo Zhang, Dongguan (CN); Yongjun Dai, Wuhan (CN); Xiaosong Liu, Shenzhen (CN); Qinghai Wang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 502 days.

(21) Appl. No.: 16/611,092

(22) PCT Filed: May 5, 2017

(86) PCT No.: PCT/CN2017/083333
§ 371 (c)(1),
(2) Date: Nov. 5, 2019

(87) PCT Pub. No.: WO2018/201484
PCT Pub. Date: Nov. 8, 2018

(65) Prior Publication Data
US 2020/0168389 A1 May 28, 2020

(51) Int. Cl.
*H01F 27/36* (2006.01)
*H01F 27/24* (2006.01)
*H01F 27/28* (2006.01)

(52) U.S. Cl.
CPC ........... *H01F 27/289* (2013.01); *H01F 27/24* (2013.01); *H01F 27/361* (2020.08)

(58) Field of Classification Search
CPC ...... H01F 27/289; H01F 27/24; H01F 27/361; H01F 27/2885; H01F 27/324; H01F 27/363; H01F 27/366
See application file for complete search history.

(56) References Cited

U.S. PATENT DOCUMENTS 3,173,115 A * 3/1965 Peuron .................... H01F 38/26 336/84 R
3,881,193 A * 4/1975 Fujimura ............... G11B 5/295
(Continued)

FOREIGN PATENT DOCUMENTS

CN 1298189 A 6/2001
CN 101236827 A 8/2008
(Continued)

OTHER PUBLICATIONS

Machine Translation and Abstract of Chinese Publication No. CN101236827, Aug. 6, 2008, 6 pages.
(Continued)

*Primary Examiner* — Mang Tin Bik Lian
(74) *Attorney, Agent, or Firm* — Conley Rose, P.C.

(57) ABSTRACT

A transformer and a switch-mode power supply are provided. The transformer includes: a magnetic core structure; several windings that surround a same magnetic cylinder in the magnetic core structure in a stacked manner, where the several windings include at least one primary-side winding and at least one secondary-side winding; and an electromagnetic shielding layer that is disposed between at least two adjacent windings, where the two adjacent windings are a primary-side winding and a secondary-side winding, and the electromagnetic shielding layer is made of a magnetic material. The electromagnetic shielding layer of the transformer can suppress a noise current of the winding, to reduce noise.

20 Claims, 6 Drawing Sheets

(56) References Cited

U.S. PATENT DOCUMENTS

| | | | | | |
|---|---|---|---|---|---|
| 4,518,941 | A * | 5/1985 | Harada | H01F 27/36 | 363/20 |
| 4,972,353 | A * | 11/1990 | Kennedy | H03G 3/3042 | 455/193.1 |
| 5,216,356 | A * | 6/1993 | Owen | H01F 27/02 | 323/361 |
| 6,950,291 | B1 * | 9/2005 | Andres | H01F 27/363 | 361/38 |
| 2003/0095024 | A1 * | 5/2003 | Markwardt | H01F 27/02 | 336/90 |
| 2003/0122646 | A1 | 7/2003 | Park | | |
| 2006/0244398 | A1 | 11/2006 | Kitamura et al. | | |
| 2007/0171585 | A1 * | 7/2007 | Sicong | H02M 1/44 | 361/38 |
| 2008/0018425 | A1 * | 1/2008 | Lu | H01F 27/363 | 336/84 R |
| 2008/0211611 | A1 | 9/2008 | Hanov | | |
| 2014/0139313 | A1 * | 5/2014 | Zhou | B65H 75/14 | 335/297 |
| 2014/0185337 | A1 * | 7/2014 | Espino | H01F 27/36 | 363/21.17 |
| 2016/0134020 | A1 | 5/2016 | Adenot Engelvin et al. | | |
| 2017/0063136 | A1 | 3/2017 | Sultenfuss et al. | | |
| 2017/0117091 | A1 * | 4/2017 | Serrano | H01F 27/38 | |
| 2018/0211761 | A1 * | 7/2018 | Zhang | H01F 27/363 | |

FOREIGN PATENT DOCUMENTS

| | | | |
|---|---|---|---|
| CN | 101521109 | A | 9/2009 |
| CN | 202102849 | U | 1/2012 |
| CN | 101151689 | B | 9/2012 |
| CN | 202564037 | U | 11/2012 |
| CN | 102881425 | A | 1/2013 |
| CN | 103021635 | A | 4/2013 |
| CN | 203503422 | U | 3/2014 |
| EP | 1329914 | A2 | 7/2003 |
| WO | 2014198832 | A1 | 12/2014 |

OTHER PUBLICATIONS

Machine Translation and Abstract of Chinese Publication No. CN101521109, Sep. 2, 2009, 6 pages.

Machine Translation and Abstract of Chinese Publication No. CN102881425, Jan. 16, 2013, 5 pages.

Machine Translation and Abstract of Chinese Publication No. CN103021635, Apr. 3, 2013, 17 pages.

Foreign Communication From a Counterpart Application, PCT Application No. PCT/CN2017/083333, English Translation of International Search Report dated Feb. 11, 2018, 3 pages.

Foreign Communication From a Counterpart Application, PCT Application No. PCT/CN2017/083333, English Translation of Written Opinion dated Feb. 11, 2018, 5 pages.

* cited by examiner

TRANSFORMER AND SWITCH-MODE POWER SUPPLY

CROSS-REFERENCE TO RELATED APPLICATIONS

This application is a National Stage of International Patent Application No. PCT/CN2017/083333 filed on May 5, 2017, which is hereby incorporated by reference in its entirety.

TECHNICAL FIELD

This application relates to the field of electrical elements, and in particular, to a transformer and a switch-mode power supply.

BACKGROUND

With rapid development of semiconductor technologies, an electromagnetic compatibility (Electromagnetic Compatibility, EMC) problem of a switch-mode power supply attracts increasing attention of people. The EMC is a capability that a device or a system can work normally in an electromagnetic environment of the device or the system and causes no unbearable electromagnetic disturbance to any object in the environment.

Generally, an electronic product generates electromagnetic interference (Electromagnetic Interference, EMI for short) in a working process, and normal working of another device may be affected. However, as a power conversion part, the switch-mode power supply is an important EMI source. If the switch-mode power supply is improperly designed, the EMI of the product exceeds a limit, and EMC authentication fails. Therefore, performing noise reduction on a transformer is important in designing the switch-anode power supply.

With development of fast charging technologies, the switch-mode power supply has an increasingly high power parameter, and also generates increasingly strong noise. In a conventional transformer noise reduction design method, a metal shielding layer is disposed between a primary-side winding and a secondary-side winding (or referred to as a primary winding and a secondary winding) of a transformer, and the metal shielding layer is directly connected to a ground cable to reduce electromagnetic interference generated by a distributed capacitance between the primary-side winding and the secondary-side winding of the transformer. As shown in FIG. 1, the metal shielding layer may be a copper foil and a conducting wire. In a specific implementation, one end is free and the other end (a static point of the primary-side winding) is grounded. An implementation principle is equivalent to adding a metal plate to a distributed capacitance between the primary-side winding and the secondary-side winding. In this way, some noise in the primary-side winding is directly bypassed to ground, and noise coupled to the secondary-side winding is reduced, to implement noise reduction. However, in this design, on one hand, if a copper foil is added, a volume of the transformer becomes larger, device miniaturization is affected, and additional costs are increased. On the other hand, if the conducting wire is used, there is a deviation in tightness and density in a process of winding the conducting wire. Therefore, it is difficult to control EMC consistency between different transformers. Consequently, EMC performance of the switch-mode power supply becomes worse.

SUMMARY

Implementations of this application aim to provide a transformer and a switch-mode power supply, to resolve a problem that EMI of the switch-mode power supply exceeds a limit and EMC consistency is poor.

An implementation of this application provides a transformer. The transformer includes a magnetic core structure, and a primary-side winding and a secondary-side winding that surround a same magnetic cylinder in the magnetic core structure in a stacked manner. There may be one or more primary-side windings and secondary-side windings. An electromagnetic shielding layer is mainly located between the primary-side winding and an auxiliary winding, and the electromagnetic shielding layer can reduce noise. Because the electromagnetic shielding layer is magnetic, the electromagnetic shielding layer has higher magnetic permeability than metal. In a high-frequency environment, the electromagnetic shielding layer is equivalent to a conductor, and conducts a magnetic field. Similar to a magnetic core, the electromagnetic shielding layer conducts noise in a winding to form a circulating current, so that the noise is dissipated at the electromagnetic shielding layer. In this way, inductive reactance of the primary-side winding is changed, and the transformer suppresses the noise, to implement noise reduction. In addition, the electromagnetic shielding layer also reflects some noise in the primary-side winding, to reduce noise energy transferred to the secondary-side winding.

To reduce noise as much as possible, in a possible design of the method in this embodiment of this application, an electromagnetic shielding layer is disposed between each primary-side winding and each secondary-side winding that are adjacent, so that a maximum of noise can be reduced to an optimal extend. Certainly, in addition, during actual assembly, based on a requirement for a noise reduction effect, an electromagnetic shielding layer is disposed between each of some primary-side windings and each of some secondary-side windings that are adjacent. In addition, the electromagnetic shielding layer provided in this embodiment of this application has very good EMC consistency, because the electromagnetic shielding layer is mounted on a winding surface, thickness, thickness, and a length, and a width are all easily controlled. In comparison with an existing winding manner, controllability is strong, and therefore, EMC consistency is very good.

In addition, during actual assembly, the primary-side winding and the secondary-side winding may surround the same magnetic cylinder in a plurality of manners. The primary-side winding or the secondary-side winding may be first wound around the framework. However, the primary-side winding and the secondary-side winding are usually wound alternately. That is, the primary-side winding is wound around the framework, and then a layer of the secondary-side winding is immediately wound. In consideration that the switch-mode power supply may also have an auxiliary winding, the primary-side winding, the auxiliary winding, and the secondary-side winding may be alternatively wounded. The windings are sleeved around the framework. The framework is sleeved around a same magnetic cylinder in the magnetic core structure. For ease of assembly of the windings, the magnetic core structure may be divided into two parts: an upper part and a lower part. Usually, the two parts, namely, the upper part and the lower part, each are an E-shaped structure. In this case, the winding can be completely encircled, to improve the efficiency of electromagnetic energy conversion.

Usually, an insulation tape is pasted to a winding surface each time a layer of a winding is wound, to ensure that no short circuit occurs between windings. In a possible design of the method in this embodiment of this application, the electromagnetic shielding layer is an insulator. In this case, the electromagnetic shielding layer may be pasted to a surface of each layer of windings, so that the electromagnetic shielding layer is used to replace the insulation tape, and both noise reduction and insulation can be implemented. Certainly, in addition to a pasting process, alternatively, a coating process may be alternatively used to coat the winding surface with the electromagnetic shielding layer.

To resolve the problem that the EMI of the switch-mode power supply exceeds a limit, the electromagnetic shielding layer in the foregoing implementations of this application needs to meet a preset magnetic permeability change curve. The magnetic permeability change curve mainly meets the following principle: reducing magnetic permeability of the transformer in an operating frequency band and increasing magnetic permeability of an electromagnetic interference EMI frequency band. In this case, currently, relatively large energy consumption is caused when a charging noise frequency falls within a range from 30 M to 100 M, and an ordinary metal shielding layer cannot effectively reduce noise at this frequency band. Therefore, in this implementation of this application, a high magnetic conductive magnetic shielding material, that is, a material whose magnetic permeability is greater than 2, is selected, and magnetic permeability of the high magnetic conductive magnetic shielding material is set based on a principle that magnetic permeability of a target frequency band (a frequency band, especially an RE frequency band, at which EMI exceeds a limit) is increased by properly reducing magnetic permeability of a switching frequency band. Such a high magnetic conductive magnetic shielding material can effectively reduce impact of charging noise within the range from 30 M to 100 M.

Further, the electromagnetic shielding layer may also be disposed on an outer surface of the framework, or an outer surface of an outermost winding. The transformer works in the high-frequency environment, and the framework and the outermost winding become conductors in the high-frequency environment. Therefore, a current is generated on the surface of the transformer. Current generation may be suppressed by pasting the electromagnetic shielding layer to the outer surface of the outermost winging or the outer surface of the framework, to implement noise reduction.

It should be noted that in another possible design of this implementation of this application, the electromagnetic shielding layer may be disposed on only an outer surface of a framework that is sleeved around a same magnetic cylinder, or the electromagnetic shielding layer is disposed on only the outer surface of the outermost winding, to implement noise reduction.

In addition to the foregoing design manner of this implementation of this application, a metal electromagnetic shielding strip that surrounds a surface of the magnetic core structure of the transformer in a head-to-tail manner. Because the metal electromagnetic shielding strip is conductive, a current on the surface may be guided by using an electromagnetic induction principle, to implement noise reduction.

The transformer provided in the foregoing implementations of this application may be applied to the switch-mode power supply, and a switch-mode power supply with the transformer can resolve the problem that the EMI of the switch-mode power supply exceeds a limit and the EMC consistency is poor.

DESCRIPTION OF EMBODIMENTS

The following further describes embodiments of this application in detail with reference to accompanying drawings.

Figure 1:
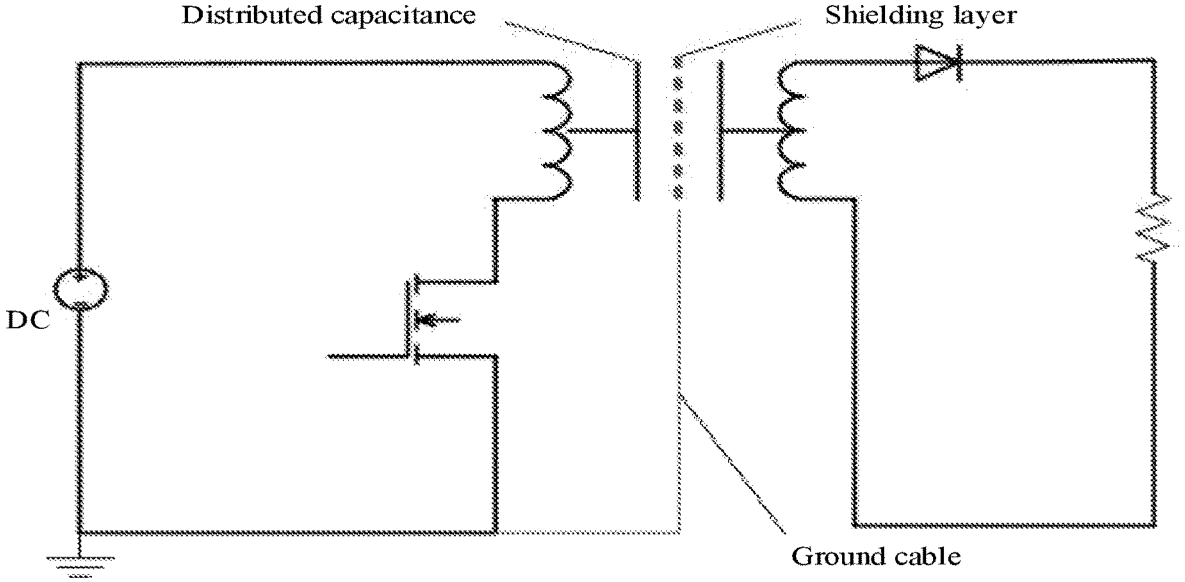
FIG. 1 (PRIOR ART)
FIG. 1 is a schematic diagram of a transformer noise reduction apparatus in the prior art.
Figure 2:
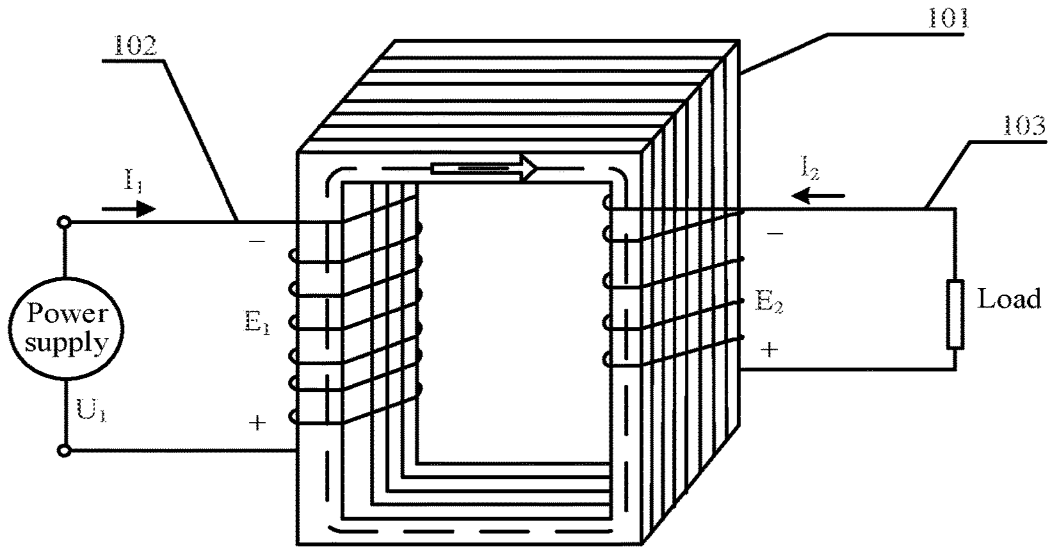
FIG. 2 is a schematic diagram of a working principle of a transformer according to an embodiment of this application.

A transformer works by using an electromagnetic induction principle. FIG. 2 is a schematic diagram of a working principle of a transformer. Main components of the transformer are an iron core 101, and a winding 102 and a winding 103 that are wound on two sides of the iron core 101. Two windings, namely, the winding 102 and the winding 103 that are insulated from each other and that have different quantities of turns are respectively sleeved around the iron core 101. The two windings are only magnetically coupled and are not electrically connected. The winding 102 connected to a power supply $U_1$ is referred to as a primary-side winding (or referred to as a primary winding), and the winding 103 connected to load is referred to as a secondary-side winding (or referred to as a secondary winding). After an alternating voltage $U_1$ of the power supply is applied to the primary-side winding, a current $I_1$ passes through the winding, and an alternating magnetic flux $\Phi$ having a same frequency as $U_1$ is generated in the iron core 101. According to the electromagnetic induction principle, electromotive forces $E_1$ and $E_2$ are respectively induced in the two windings. A relationship between the electromotive forces $E_1$ and $E_2$ and the alternating magnetic flux $\Phi$, the primary-side winding 102, and the secondary-side winding 103 is shown in a formula [1] and a formula [2].

$$E_1 = -N_1\frac{d\phi}{dt};\text{ and}\qquad \text{Formula [1]}$$

$$E_2 = -N_2\frac{d\phi}{dt}.\qquad \text{Formula [2]}$$

In the foregoing formula, a punctuation "–" indicates that the induced electromotive force always hinders a change of the magnetic flux, $N_1$ is a quantity of turns of the primary-side winding, and $N_2$ is a quantity of turns of the secondary-side winding.

It can be learned that, if the load is connected to the secondary-side winding 103, a current $I_2$ flows through the load under the action of the electromotive force $E_2$, to transfer electric energy. It can be learned from the foregoing formulas that values of the induced electromotive forces in the primary-side winding 102 and the secondary-side winding 103 are proportional to a quantity of turns of the windings. Therefore, a voltage can be changed provided that the quantity of turns of the primary-side winding 102 and the quantity of turns of the secondary-side winding 103 are changed. This is a basic working principle of the transformer.

A coil of the transformer is usually referred to as a winding, and is a circuit part of the transformer. A small transformer usually formed by winding an enameled round copper wire that is insulated, and a transformer with a slightly larger capacity is formed by winding a flat copper wire or a flat aluminum wire. In the transformer, a winding connected to a high-voltage grid is referred to as a high-voltage winding, and a winding connected to a low-voltage grid is referred to as a low-voltage winding. The windings may be classified into two types: a concentric winding and an overlapping winding based on different mutual positions and shapes of the high-voltage winding and the low-voltage winding.

The concentric winding is a winding that is sleeved around a magnetic core cylinder by using a same cylindrical line on any transverse profile of the magnetic core cylinder. For ease of insulation from a magnetic core structure, the low-voltage winding is always placed inside and is close to the magnetic core cylinder, and the high-voltage winding is placed outside. A specified insulation gap needs to be reserved between the high-voltage winding and the low-voltage winding and between the low-voltage winding and an iron core cylinder. When the low-voltage winding is placed inside and is close to the magnetic core cylinder, because an insulation distance required between the low-voltage winding and the magnetic core cylinder is relatively small, a size of the winding can be reduced, and an external size of the entire transformer is also reduced simultaneously. In addition, both the primary-side winding and the secondary-side winding are wound around a same magnetic cylinder. In comparison with a winding manner shown in FIG. 2, there is a smaller energy loss during electromagnetic conversion, to improve electromagnetic conversion efficiency.

Concentric windings may be classified into a plurality of types such as a cylindrical winding, a spiral winging, and a continuous winding according to different winding methods. The concentric winding has a simple structure and is easy to manufacture, and a transformer with the concentric winding has a small size. Therefore, the concentric winding is usually used in a transformer of a switch-mode power supply.

Figure 3:
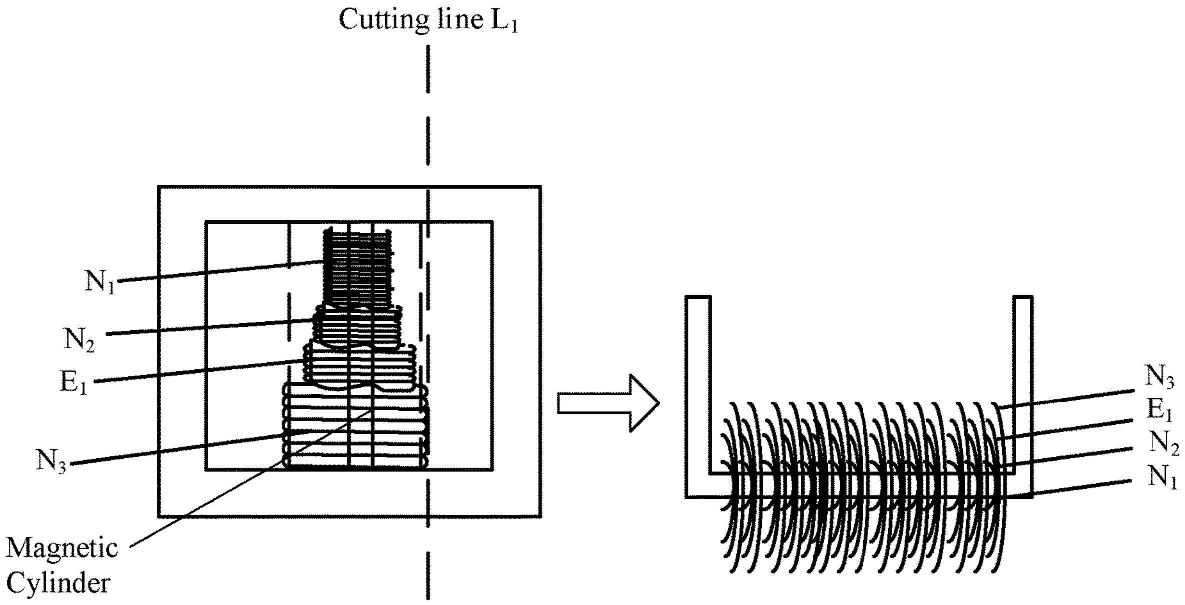
FIG. 3 is a schematic diagram of a noise transmission mechanism of a transformer according to an embodiment of this application.
Figure 4:
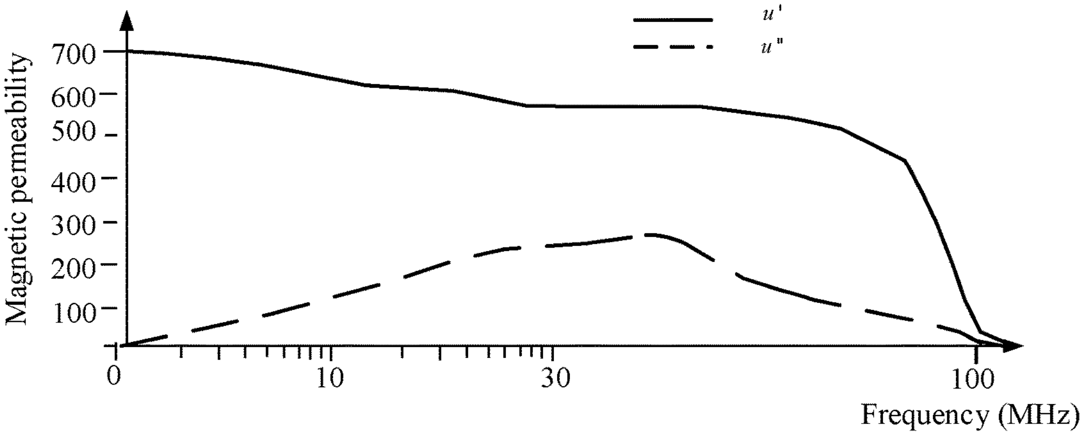
FIG. 4 is a schematic diagram of a magnetic permeability change curve of a transformer according to an embodiment of this application.

A noise transmission mechanism of a conventional transformer with a concentric winding is shown in FIG. 3. A left part in FIG. 3 shows that the primary-side winding, the secondary-side winding, and the auxiliary winding all surround a middle magnetic core cylinder in a magnetic core structure, where $N_1$ is the secondary-side winding close to the middle magnetic core cylinder, that is, a low-voltage winding, $N_2$ is an auxiliary winding that surrounds $N_1$, $E_1$ is a shielding winding that surrounds $N_2$, and $N_3$ is the primary-side winding that surrounds $E_1$, that is, a high-voltage winding. The transformer shown in FIG. 3 is cut along a line $L_1$, to obtain a profile in a right part in FIG. 3. An outermost U-shaped structure shown in the right part in FIG. 3 is a transformer magnetic core, and windings such as $N_1$, $N_2$, $E_1$, and $N_3$ are all wound around a middle magnetic cylinder of the transformer magnetic core from inside to outside. The transformer is mainly used for power conversion. That is, energy on a high-voltage side of the primary-side winding $N_3$ is transferred to a low-voltage side of the secondary-side winding $N_1$. Because a parasitic parameter (distributed capacitance) exists between windings, noise is also coupled from the primary-side winding $N_3$ of the transformer to the secondary-side winding $N_1$, to form a noise loop. In the prior art, a metal electromagnetic shielding layer is used to shield the noise loop. However, in a working process of a switch-mode power supply with the transformer, a switching frequency in a charging process is about 100K hertz (specifically, the switching frequency is determined based on a charging current, and is basically less than 1 M). However, currently, relatively large energy consumption is caused when a charging noise frequency falls within a range from 30 M hertz to 100 M hertz. Therefore, radiation noise in the current charging process mainly falls within the range from 30 M hertz to 100 M hertz. Because an ordinary metal shielding layer cannot effectively reduce noise in this frequency band, this embodiment of this application provides a schematic line graph in which magnetic permeability of a high magnetic conductive magnetic shielding material changes with frequency. Specifically, magnetic permeability on a longitudinal axis in FIG. 4 is a complex number, and an expression is u=u'+ju". Usually, most magnetic permeability is the real part u', and represents a capability of conducting a magnetic line by using the material. u" indicates a magnetic loss of the material. To enable the high magnetic conductive magnetic shielding material to reduce noise, u" in the low frequency band needs to be reduced, and u" in the high frequency band above 30 MHz needs to be increased. In this way, a loss in a switching frequency band is reduced, and a loss in the radiation noise frequency band is increased. Because an electromagnetic shielding layer that is made of the high magnetic conductive magnetic shielding material is located between different adjacent windings of the transformer, leakage inductance becomes larger. Therefore, u' in the low frequency band needs to be reduced as much as possible, to reduce a magnetic line that directly traverses the shielding material from the magnetic core. However, due to an inherent feature of the magnetic material, a change rend of u' is that u' usually gradually decreases with frequencies that change from a low frequency to a high frequency. Therefore, in a specific design, the magnetic material may be specifically selected based on a balance between a noise reduction effect and energy efficiency that are required in an actual industrial design. Therefore, in this embodiment of the present invention, based on an actual requirement, the magnetic permeability in the switching frequency band is properly reduced, and magnetic permeability in a target frequency band (a frequency band, especially an RE frequency band in which EMI exceeds a limit) is increased, to obtain a magnetic permeability change curve. A high magnetic conductive magnetic shielding material that meets the curve is modulated based on the magnetic permeability change curve, and the high magnetic conductive magnetic shielding material is mounted between adjacent windings, so that impact of charging noise within a range from 30 M to 100 M can be effectively reduced.

Based on the working principle and the noise transmission mechanism of the transformer, this embodiment of this application provides a transformer. The transformer is obtained by mainly adding an electromagnetic shielding layer to an existing transformer structure, and the electromagnetic shielding layer may be mounted between different adjacent windings. Because the electromagnetic shielding layer is made of a magnetic material, inductive reactance on a winding surface can be changed, and noise generation on the winding surface is suppressed. Specifically, a main structure of the transformer includes a magnetic core structure, and a primary-side winding and a secondary-side winding that surround a same magnetic cylinder in the magnetic core structure in a stacked manner. There may be one or more primary-side windings and secondary-side windings. The primary-side winding and the secondary-side winding usually alternatively surround a same magnetic cylinder in the electromagnetic structure in the stacked manner. The electromagnetic shielding layer is located between the primary-side winding and the auxiliary winding. The electromagnetic shielding layer may be located between only some adjacent primary-side windings and auxiliary windings, or the electromagnetic shielding layer may be disposed between every two adjacent windings. Certainly, the electromagnetic shielding layer is disposed between every two adjacent windings to reduce noise to a greatest extend.

Figure 5:
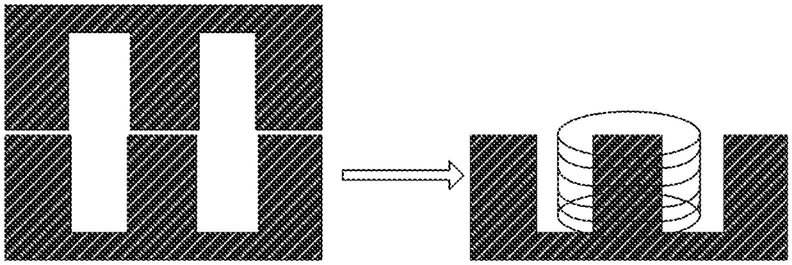
FIG. 5 is a schematic diagram of a magnetic core structure of a transformer according to an embodiment of this application.

The magnetic core structure of the transformer needs to be a magnet loop. A possible design of the magnetic core structure is a conventional hollow-shaped structure, and another possible design is an E-shaped structure. The magnetic core structure is usually a high-frequency magnetic core, and a material may be ferrite, for example, Mn—Zn ferrite, silicon-aluminum ferrite, or an amorphous alloy. In this embodiment of this application, an E-shaped structure is preferably used. As shown in FIG. 5, in a left part in the schematic diagram, an upper E-shaped structure and a lower E-shaped structure form the magnetic core structure in this application. Because each winding is wound around the middle magnetic cylinder in the E-shaped structure, the magnetic core structure of the E-shaped structure can completely encircle the windings, so that the windings are completely placed in a magnetic field. Therefore, an energy loss during electromagnetic conversion is less relative to the hollow-shaped structure, to improve energy conversion efficiency. In addition, because the magnetic core structure includes two E-shaped structures, the windings may be first processed, the framework of the windings is sleeved around the middle magnetic cylinder, and then the upper E-shaped structure is fastened. Apparently, such a design facilitates assembly of the windings, and helps production in a production line.

With reference to FIG. 3, a noise reduction principle of the electromagnetic shielding layer of the transformer in this embodiment of this application is as follows: After the transformer is powered on and works, an alternating current passes through the primary-side winding $N_3$, an induced magnetic field occurs in the coil, and an induced electromotive force is generated in the secondary-side coil according to an electromagnetic induction principle. In this process, the transformer generates a voltage by performing mutual inductance on the secondary-side winding by using an inductor of the transformer. Because of the parasitic parameter such as leakage inductance, a weak inductive reactance exists in the primary-side winding of the transformer, and suppresses an alternating current of the transformer to some extent. An electromagnetic shielding layer is added between the primary-side winding $N_3$ and the secondary-side winding $N_1$. The electromagnetic shielding layer has high magnetic permeability, and is equivalent to a conductor in a high-frequency environment. Therefore, the electromagnetic shielding layer conducts the magnetic field. Similar to a magnetic core, the electromagnetic shielding layer conducts noise in a winding to form a circulating current, so that the noise is dissipated at the electromagnetic shielding layer. In this way, inductive reactance of the primary-side winding is changed, so that the transformer suppresses the noise, to implement noise reduction. The electromagnetic shielding layer also reflects some noise in the primary-side winding, to reduce noise energy transferred to the secondary-side winding. In addition, the transformer provided in this embodiment of this application is mainly applicable to the switch-mode power supply. The switch-mode power supply may be a wired switch-mode power supply, or may be a wireless switch-mode power supply. For example, a phone charger may implement voltage conversion from 220 V to 5 V. In this case, a working frequency of a transformer of the phone charger is dozens of kilohertz. Because magnetic permeability of an electromagnetic shielding layer is usually greater than 2, and the magnetic permeability of the electromagnetic shielding layer further meets a preset magnetic permeability change curve, impact of charging noise, for example, charging noise ranging from 10 M to 100 M, and charging noise ranging from 30 M to 100 M, can be effectively reduced.

In addition, in addition to being mounted between different windings, the electromagnetic shielding layer may also be mounted on an outer surface of an outermost winding, or on an outer surface of an innermost framework. That is, an electromagnetic shielding layer is wrapped around the outer surface of the framework of the innermost winding, and if the outermost winding is a primary-side winding, an electromagnetic shielding layer is mounted on the outer surface of the outermost winding. In this case, noise can be reduced, because the transformer works in the high-frequency environment, and the framework and the outermost winding become conductors in the high-frequency environment. Therefore, a current is generated on the surface of the transformer. Current generation may be suppressed by pasting the electromagnetic shielding layer to the outer surface of the outermost winging or the outer surface of the framework, to implement noise reduction.

To make the EMI of the transformer meet a standard, a designer tests the magnetic permeability curve of the electromagnetic shielding layer in advance, to obtain a magnetic permeability change curve that can enable the EMI of the transformer to meet a standard. Then, a material provider modulates the electromagnetic shielding material based on the magnetic permeability change curve. The electromagnetic shielding material is mainly a soft magnetic material, and the soft magnetic material is mainly used for magnetic conduction and electromagnetic energy conversion and transmission. Therefore, relatively high magnetic permeability and magnetic induction intensity are required for such materials, and an area and a magnetic loss of a magnetic hysteresis loop are relatively small. Generally, soft magnetic materials can be classified into four categories: (1) an alloy thin band or sheet such as FeNi; (2) an amorphous alloy thin band such as Fe base or Co base; (3) a magnetic medium (also referred to as iron powder core), for example, powers such as FeNi (Mo), FeSiAl, a carbonyl iron powder, and ferrite that are wrapped and bonded by using an electrical insulating medium and then are pressed to form the magnetic medium based on a requirement; and (4) ferrite that includes spinel type—$Mo{\cdot}Fe_2o_3$; (M represents NiZn/MnZn/MgZ, or the like) and magneto plumbite type—

$Ba_3Me_2Fe_{24}O_{41}$ (Me represents Co/Ni/Mg/Zn/Cu, and composite parts). Currently, ferrite is commonly used mainly because raw materials are rich and have low costs, and the magnetic permeability change curve is relatively stable.

The designer may mount, on a winding/framework surface by using a pasting process or a coating process, the electromagnetic shielding material that meets the requirement and that is provided by the material provider. The electromagnetic shielding material may be insulated or may be a conductor. If the electromagnetic shielding material is a conductor, an adhesive tape needs to be pasted first before the conductor is mounted on the winding surface, to ensure that the winding and the electromagnetic shielding material are insulated. Otherwise, there is an electrical connection between the electromagnetic shielding layer and the winding, and a short circuit is caused. If the electromagnetic shielding material is insulated, the electromagnetic shielding material may be processed to be in an adhesive tape form that has adhesiveness. In this way, not only insulation can be implemented, but also a winding coil can be fastened. It can be learned that the electromagnetic material shielding layer can replace the adhesive tape on the winding. Therefore, a process of pasting the insulation tape can be reduced.

In consideration that the transformer provided in this embodiment of this application is mainly applicable to the switch-mode power supply and a component on a circuit board of the switch-mode power supply needs to provide a working voltage, the transformer provided in this embodiment of this application further includes at least one auxiliary winding that surrounds a same magnetic cylinder in a stacked manner. The auxiliary winding mainly provides a working voltage for the component on the circuit board of the switch-mode power supply. There may be one or more auxiliary windings. The auxiliary winding may be located between the primary-side winding and the secondary-side winding, or may be located on two sides of the primary-side winding and the secondary-side winding. That is, windings that are wound from inside to outside may be separately the secondary-side winding, the auxiliary winding, and the primary-side winding, or may be the secondary-side winding, the primary-side winding, and the auxiliary winding, or may be the auxiliary winding, the secondary-side winding, and the primary-side winding. In this case, the location of the electromagnetic shielding layer may also be between the primary-side winding and the auxiliary winding, or may be between the secondary-side winding and the auxiliary winding.

Because windings of the transformer include the primary-side winding, the secondary-side winding, and the auxiliary winding, there may be a plurality of windings, there are a plurality of manners in which the windings are stacked, and there are various locations at which the electromagnetic shielding layer is mounted. Therefore, this embodiment of this application provides schematic diagrams of locations shown in FIG. 6 to FIG. 11, to describe various assembly structures of the transformer by using examples.

Figure 6:
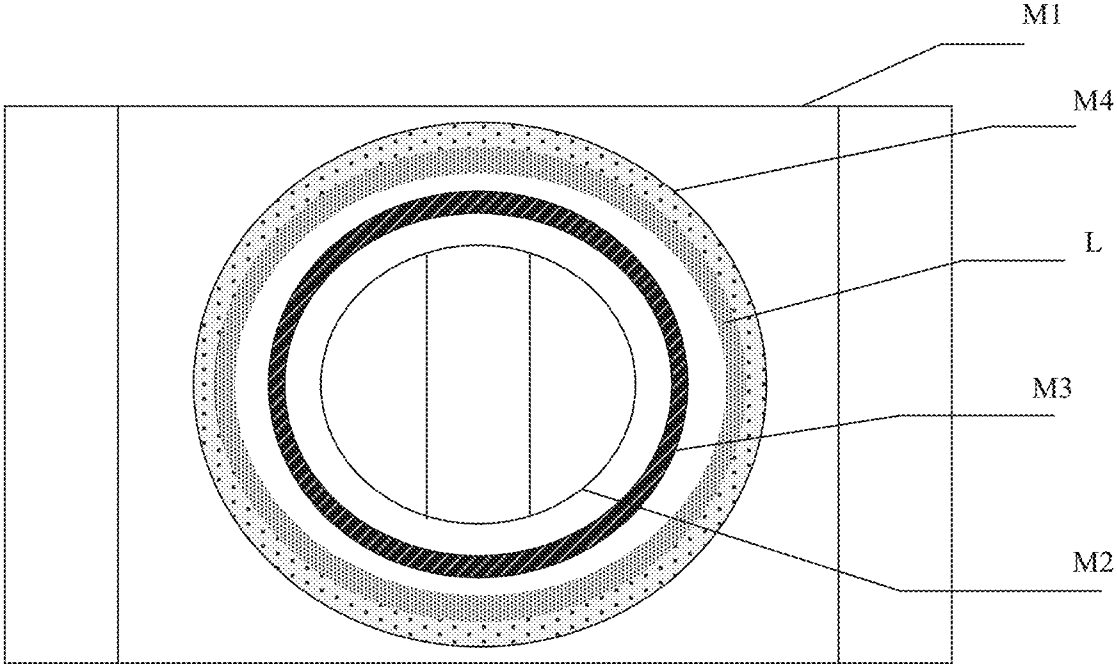
FIG. 6 to FIG. 11 are schematic structural diagrams of a location at which an electromagnetic shielding layer of a transformer is assembled according to an embodiment of this application.

In FIG. 6, descriptions are provided in a sequence from inside to outside of a concentric circle. An innermost layer is a middle magnetic cylinder of a magnetic core structure M1, and a framework M2, a secondary-side winding M3, an electromagnetic shielding layer L, and a primary-side winding M4 are sleeved around the middle magnetic cylinder. It can be learned that the electromagnetic shielding layer is located between the primary-side winding and the secondary-side winding, and the electromagnetic shielding layer is mounted on an inner side of the primary-side winding M4.

Figure 7:
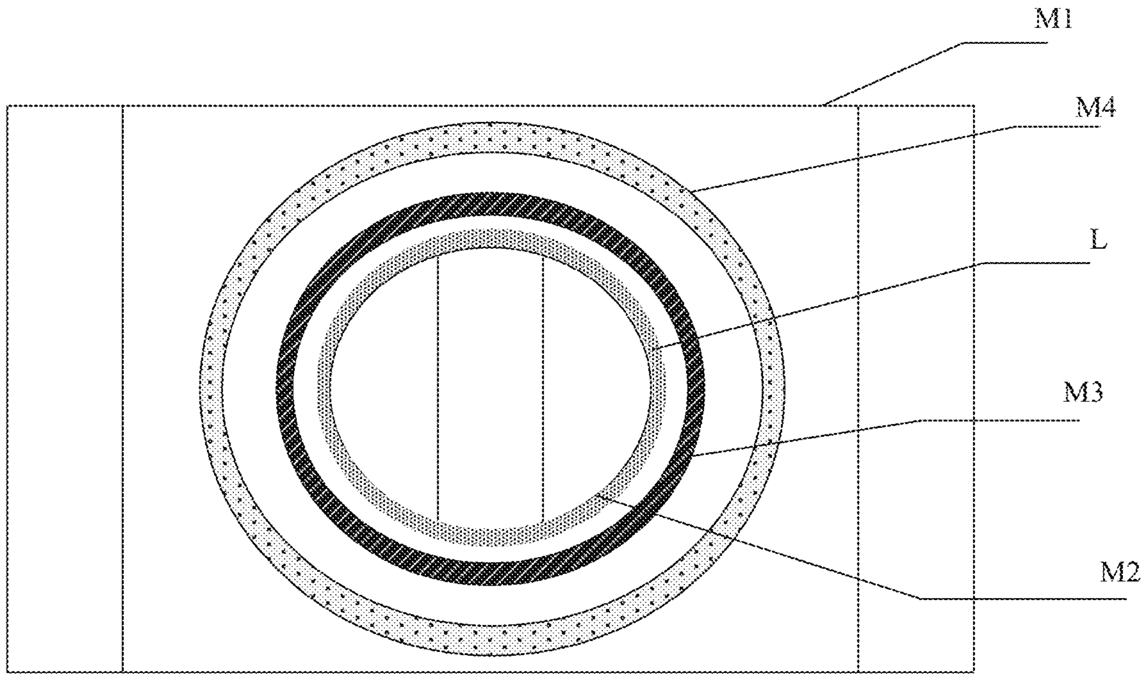

In FIG. 7, descriptions are provided in a sequence from inside to outside of a concentric circle. An innermost layer is a middle magnetic cylinder of a magnetic core structure M1, and a framework M2, an electromagnetic shielding layer L, a secondary-side winding M3, and a primary-side winding M4 are sleeved around the middle magnetic cylinder. It can be learned that the electromagnetic shielding layer is located on an outer side of the framework.

Figure 8:
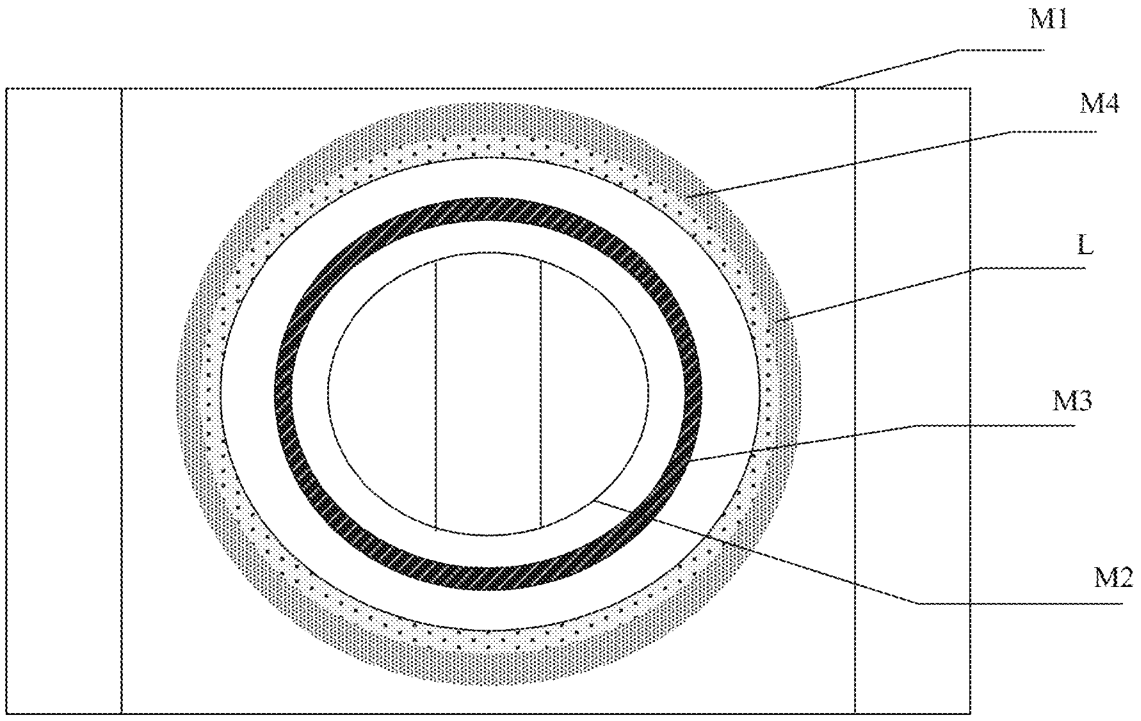

In FIG. 8, descriptions are provided in a sequence from inside to outside of a concentric circle. An innermost layer is a middle magnetic cylinder of a magnetic core structure M1, and a framework M2, a secondary-side winding M3, a primary-side winding M4, and an electromagnetic shielding layer L are sleeved around the middle magnetic cylinder. It can be learned that the electromagnetic shielding layer is located on an outer side of an outermost winding, namely, the primary-side winding.

Figure 9:
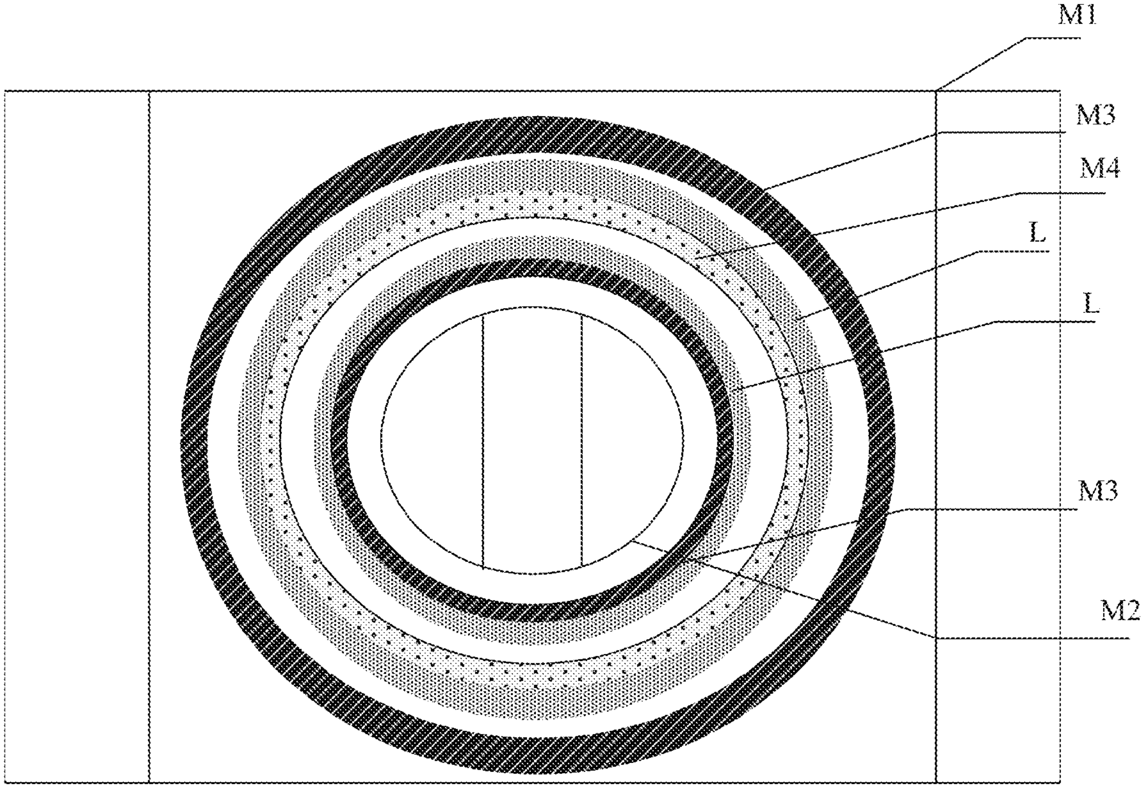

In FIG. 9, there are two secondary-side windings M3 and one primary-side winding M4. Specifically, descriptions are provided in a sequence from inside to outside of a concentric circle. An innermost layer is a middle magnetic cylinder of a magnetic core structure M1, and a framework M2, a secondary-side winding M3, an electromagnetic shielding layer L, a primary-side winding M4, an electromagnetic shielding layer L, and a secondary-side winding M3 are sleeved around the middle magnetic cylinder. It can be learned that there are two electromagnetic shielding layers, one electromagnetic shielding layer is mounted on an outer side of the secondary-side winding M3, and the other electromagnetic shielding layer is mounted on an outer side of the primary-side winding M4.

Figure 10:
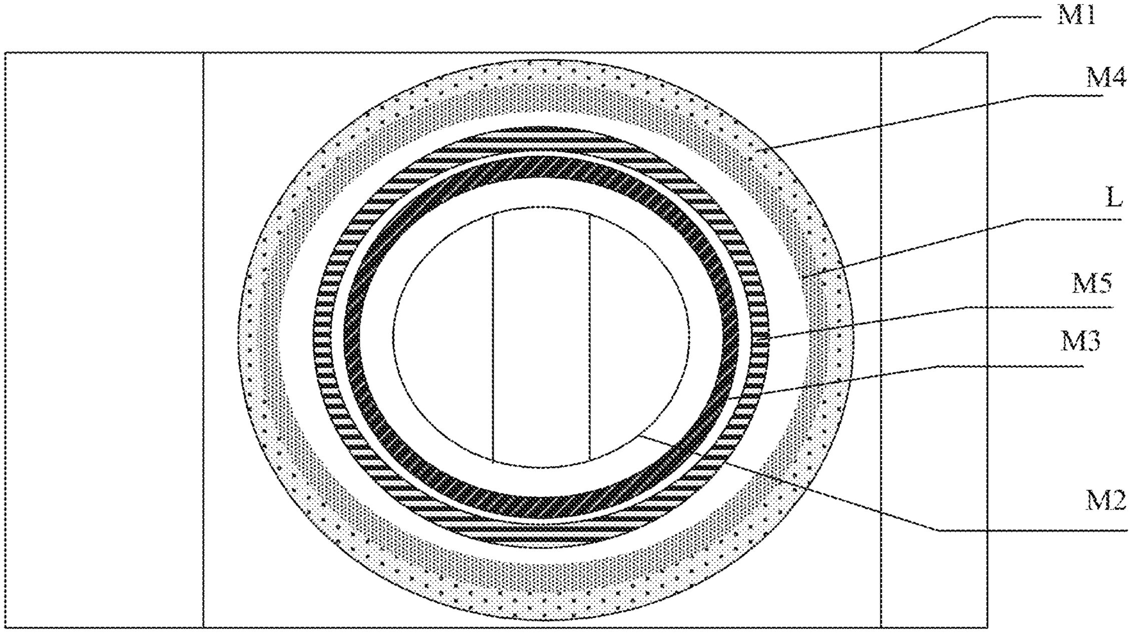

In FIG. 10, descriptions are provided in a sequence from inside to outside of a concentric circle. An innermost layer is a middle magnetic cylinder of a magnetic core structure M1, and a framework M2, a secondary-side winding M3, an auxiliary winding M5, an electromagnetic shielding layer L, and a primary-side winding M4 are sleeved around the middle magnetic cylinder. It can be learned that the electromagnetic shielding layer is located between the primary-side winding and the auxiliary winding, and the electromagnetic shielding layer is mounted on an inner side of the primary-side winding M4.

Figure 11:
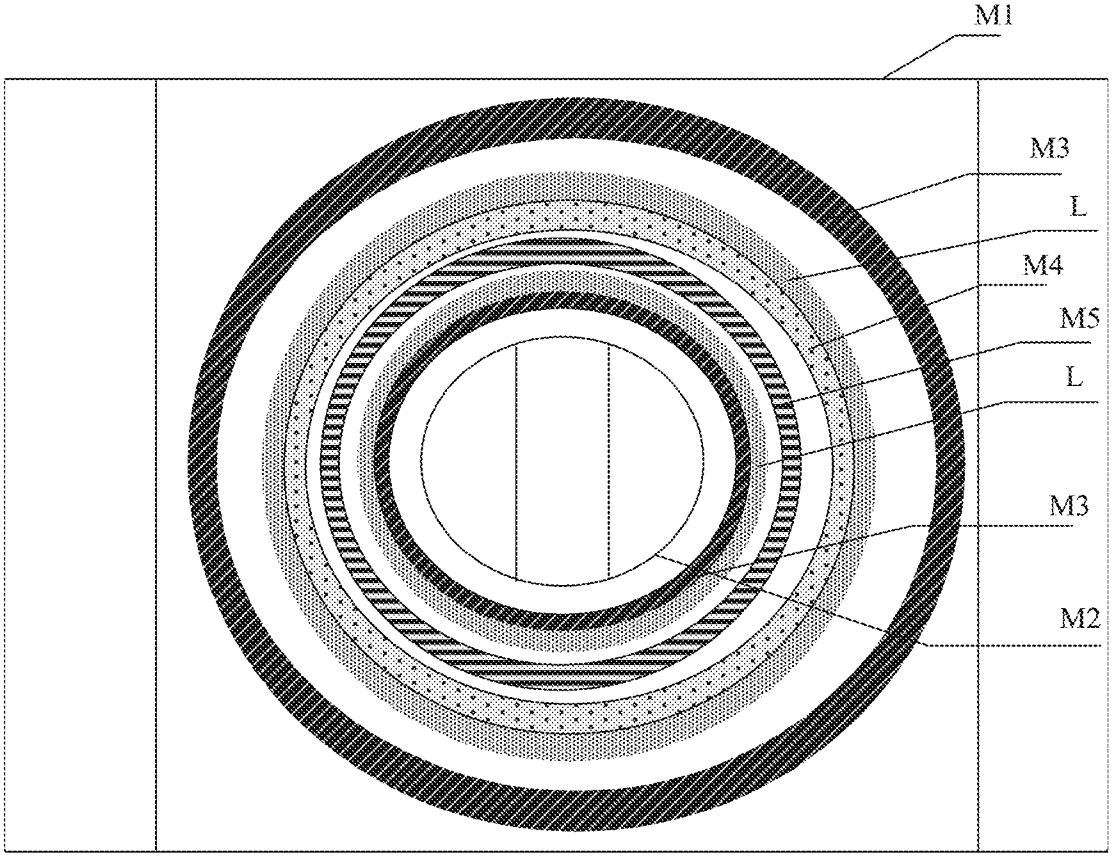

In FIG. 11, there are two secondary-side windings M3, one primary-side winding M4, and an auxiliary winding M5. Specifically, descriptions are provided in a sequence from inside to outside of a concentric circle. An innermost layer is a middle magnetic cylinder of a magnetic core structure M1, and a framework M2, a secondary-side winding M3, an electromagnetic shielding layer L, an auxiliary winding M5, a primary-side winding M4, an electromagnetic shielding layer L, and a secondary-side winding M3 are sleeved around the middle magnetic cylinder. It can be learned that there are two electromagnetic shielding layers, one electromagnetic shielding layer is mounted on an outer side of the secondary-side winding M3, and the other electromagnetic shielding layer is mounted on an outer side of the primary-side winding M4.

It should be noted that FIG. 6 to FIG. 11 merely describe a part of an assembly structure of the transformer. Actually, the primary-side winding may also be wound around the framework, and the secondary-side winding is wound around the primary-side winding. Regardless of an assembly structure, noise is reduced by mounting the electromagnetic shielding layer on the winding. Noise reduction principles are consistent.

Figure 12:
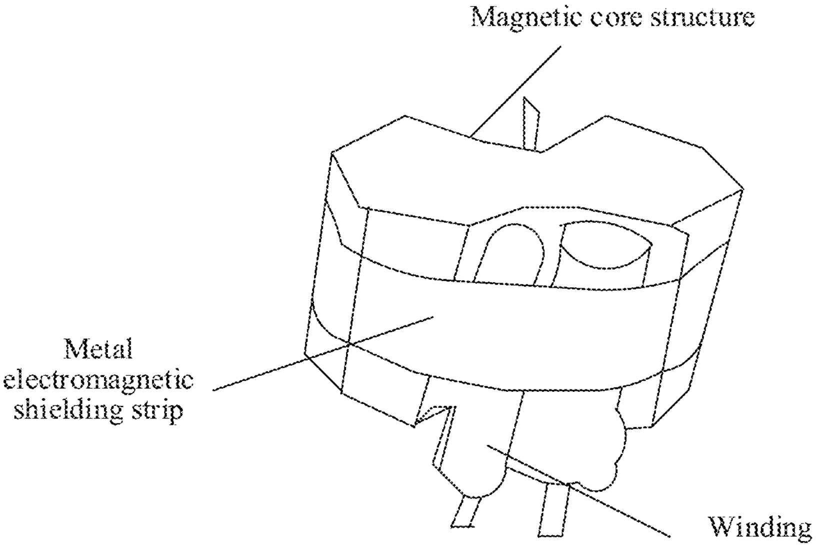
FIG. 12 is a schematic structural diagram of a location at which a metal electromagnetic shielding strip of a transformer is assembled according to an embodiment of this application.

In addition, a metal electromagnetic shielding strip may further surround, in a head-to-tail manner, an outer surface of the magnetic core structure of the transformer provided in this embodiment of this application. As shown in FIG. 12, the metal electromagnetic shielding strip may be a copper foil. Because the metal electromagnetic shielding strip is conductive, impact of a magnetic field around the magnetic core structure can be reduced, and a noise current on the surface of the transformer is conducted.

In conclusion, in the transformer provided in this embodiment of this application, the electromagnetic shielding layer is added to a winding or a framework, and a high magnetic conduction characteristic of the electromagnetic shielding layer suppresses noise generated by the transformer in a working process, to resolve a problem that EMI exceeds a limit. The transformer may be applied to a scenario such as a de-Y capacitor with a relatively high noise reduction requirement. In addition, the electromagnetic shielding layer provided in this embodiment of this application has very good EMC consistency, because the electromagnetic shielding layer is mounted on a winding surface, and thickness, a length and a width are all easily controlled. In comparison with an existing winding manner, controllability is strong, and therefore, EMC consistency is very good. In addition, the method helps production and processing, EMC performance is relatively good, and an application prospect is broad.

In the foregoing specific implementations, the objectives, technical solutions, and beneficial effects of this application are further described in detail. It should be understood that different embodiments may be combined, and the foregoing descriptions are merely specific implementations of this application, but are not intended to limit the protection scope of this application. Any combination, modification, equivalent replacement, or improvement made without departing from the spirit and principle of this application shall fall within the protection scope of this application.

What is claimed is:

1. A transformer, comprising:

a magnetic core structure comprising an upper part and a lower part, wherein each part is an E-shaped structure;

a magnetic cylinder in the magnetic core structure, wherein the magnetic cylinder is a middle magnetic cylinder in the E-shaped structure and comprises a framework surrounded by several windings in a stacked manner, and wherein the several windings comprise a primary-side winding and a first secondary-side winding;

a first electromagnetic shielding layer coupled to the magnetic cylinder and disposed on an outer surface of the first secondary-side winding, wherein the first electromagnetic shielding layer is made of a magnetic material and is an insulator, and wherein a first magnetic permeability of the first electromagnetic shielding layer meets a preset magnetic permeability change curve;

an auxiliary winding that is located between the primary-side winding and the first secondary-side winding and that is disposed on an outer surface of the first electromagnetic shielding layer;

a second electromagnetic shielding layer coupled to the magnetic cylinder and disposed on an outer surface of the primary-side winding, wherein the second electromagnetic shielding layer is made of the magnetic material and is the insulator, and wherein the second electromagnetic shielding layer reduces an impact of charging noise frequency falls within a range from 30 megahertz (MHz) to 100 MHz; and a second secondary-side winding disposed on the second electromagnetic shielding layer.

2. The transformer of claim 1, wherein the primary-side winding and the secondary-side winding alternately surround the magnetic cylinder in the stacked manner.

3. The transformer of claim 1, wherein the auxiliary winding surrounds the magnetic cylinder in the magnetic core structure in the stacked manner.

4. The transformer of claim 1, wherein the primary-side winding, the auxiliary winding, and the secondary-side winding alternately surround the magnetic cylinder in the stacked manner.

5. The transformer of claim 1, wherein the first electromagnetic shielding layer is disposed on a winding surface using a pasting process or a coating process.

6. The transformer of claim 1, wherein the first magnetic permeability of the first electromagnetic shielding layer is greater than two.

7. The transformer of claim 6, wherein a material of the first electromagnetic shielding layer is ferrite.

8. The transformer of claim 1, wherein the transformer further comprises a metal electromagnetic shielding strip that surrounds a surface of the magnetic core structure in a head-to-tail manner.

9. A switch-mode power supply, comprising:

a transformer comprising:

a magnetic core structure comprising an upper part and a lower part, wherein each part is an E-shaped structure;

a magnetic cylinder coupled to the magnetic core structure, wherein the magnetic cylinder is a middle magnetic cylinder in the E-shaped structure and comprises a framework surrounded by several windings in a stacked manner, and wherein the several windings comprise a primary-side winding and a first secondary-side winding;

a first electromagnetic shielding layer disposed on an outer surface of the first secondary-side winding, wherein the first electromagnetic shielding layer is made of a magnetic material and is an insulator, wherein the switch-mode power supply does not comprise a Y capacitor;

an auxiliary winding that is located between the primary-side winding and the secondary-side winding and that is disposed on an outer surface of the first electromagnetic shielding layer;

a second electromagnetic shielding layer coupled to the magnetic cylinder and disposed on an outer surface of the primary-side winding, wherein the second electromagnetic shielding layer is made of the magnetic material and is the insulator, and wherein the second electromagnetic shielding layer reduces an impact of charging noise frequency falls within a range from 30 megahertz (MHz) to 100 MHz; and a second secondary-side winding disposed on the second electromagnetic shielding layer.

10. The switch-mode power supply of claim 9, wherein a material of the first electromagnetic shielding layer is ferrite.

11. The switch-mode power supply of claim 9, wherein the transformer further comprises a metal electromagnetic shielding strip that surrounds a surface of the magnetic core structure in a head-to-tail manner.

12. The switch-mode power supply of claim 9, wherein the first electromagnetic shielding layer is disposed on a winding surface using a pasting process.

13. The switch-mode power supply of claim 9, wherein the first electromagnetic shielding layer is disposed on a winding surface using a coating process.

14. The switch-mode power supply of claim 9, wherein a material of the first electromagnetic shielding layer is ferrite.

15. A charger configured to perform terminal power fast charging, wherein the charger comprises:

a transformer comprising:

a magnetic core structure comprising an upper part and a lower part, wherein each part is an E-shaped structure;

a magnetic cylinder coupled to the magnetic core structure, wherein the magnetic cylinder is a middle magnetic cylinder in the E-shaped structure and comprises a framework surrounded by several windings in a stacked manner, and wherein the several windings comprise a primary-side winding and a first secondary-side winding;

a first electromagnetic shielding layer disposed on an outer surface of an outermost winding of the several windings the primary-side winding and the first secondary-side winding, wherein the first electromagnetic shielding layer is made of a magnetic material and is an insulator, wherein the charger does not comprise a Y capacitor;

an auxiliary winding that is located between the primary-side winding and the secondary-side winding and that is disposed on an outer surface of the first electromagnetic shielding layer;

a second electromagnetic shielding layer coupled to the magnetic cylinder and disposed on an outer surface of the primary-side winding, wherein the second electromagnetic shielding layer is made of the magnetic material and is the insulator, and wherein the second electromagnetic shielding layer reduces an impact of charging noise frequency falls within a range from 30 megahertz (MHz) to 100 MHz; and a second secondary-side winding disposed on the second electromagnetic shielding layer.

16. The charger of claim 15, wherein a material of the first electromagnetic shielding layer is ferrite.

17. The charger of claim 15, wherein the first magnetic permeability of the first electromagnetic shielding layer is greater than two.

18. The charger of claim 15, wherein the first electromagnetic shielding layer is disposed on a winding surface using a pasting process.

19. The charger of claim 15, wherein the first electromagnetic shielding layer is disposed on a winding surface using a coating process.

20. The charger of claim 15, wherein the primary-side winding and the secondary-side winding alternately surround the magnetic cylinder in the stacked manner.

* * * * *